United States Patent
Choquette et al.

(10) Patent No.: US 7,800,051 B2
(45) Date of Patent: Sep. 21, 2010

(54) APPARATUS AND METHOD FOR MONITORING SNOW WATER EQUIVALENT AND SOIL MOISTURE CONTENT USING NATURAL GAMMA RADIATION

(75) Inventors: Yves Choquette, Boucherville (CA); Pierre Lavigne, Boucherville (CA); Pierre Ducharme, Saint-Eustache (CA); Alain Houdayer, Montréal (CA); Jean-Pierre Martin, Laval (CA)

(73) Assignee: Hydro-Quebec, Montreal QC (CA)

( * ) Notice: Subject to any disclaimer, the term of this patent is extended or adjusted under 35 U.S.C. 154(b) by 0 days.

(21) Appl. No.: 12/008,170

(22) Filed: Jan. 9, 2008

(65) Prior Publication Data
US 2008/0164407 A1    Jul. 10, 2008

(30) Foreign Application Priority Data
Jan. 10, 2007  (CA) .................................. 2573711

(51) Int. Cl.
*G01V 5/00*    (2006.01)
(52) U.S. Cl. ..................................... 250/253
(58) Field of Classification Search ............... 250/253
See application file for complete search history.

(56) References Cited

U.S. PATENT DOCUMENTS

| | | | |
|---|---|---|---|
| 3,432,656 A | 3/1969 | Smith et al. | |
| 3,665,180 A | 5/1972 | Guillot et al. | |
| 4,047,042 A | 9/1977 | Wada et al. | |
| 4,187,908 A * | 2/1980 | Fertl et al. | 166/254.2 |
| 4,614,870 A | 9/1986 | Morrison | |
| 4,620,421 A * | 11/1986 | Brown et al. | 62/3.7 |
| 4,649,276 A * | 3/1987 | Suzuki | 250/370.11 |

(Continued)

FOREIGN PATENT DOCUMENTS

CA    1079413    6/1980

(Continued)

OTHER PUBLICATIONS

Bissell et al. Monitoring Snow Water Equivalent by Using Natural Soil Radioactivity, Water Resources Research, vol. 9, No. 4 (Aug. 1973), pp. 885-890.*

(Continued)

*Primary Examiner*—David P Porta
*Assistant Examiner*—Shun Lee
(74) *Attorney, Agent, or Firm*—Muirhead and Saturnelli, LLC

(57) ABSTRACT

A gamma monitoring apparatus and method for measuring water equivalent of snowpack over a selected ground area. A detector unit is installed at a given height above the area. The detector unit has a collimator and a scintillator coupled to a photomultiplier tube for detecting gamma rays emitted by naturally radioactive elements present in soil under the snowpack and absorbed by the snowpack in a field of view defined by the collimator. Pulses in a signal produced by the photomultiplier tube are measured and those exceeding threshold energy levels in a number of energy windows are registered as gamma counts. The water equivalent of the snowpack is periodically computed as functions of the gamma counts in the energy windows and the height of the detector unit with respect to ground level. The data representing the computed water equivalent are stored and controllably transmitted for reporting. Soil moisture content is also determinable.

29 Claims, 10 Drawing Sheets

U.S. PATENT DOCUMENTS

| | | | |
|---|---|---|---|
| 4,992,667 A | | 2/1991 | Abelentsev et al. |
| 5,124,101 A | * | 6/1992 | Hirao et al. ............... 264/82 |
| 5,218,208 A | * | 6/1993 | Augier et al. ......... 250/363.02 |
| 5,594,250 A | | 1/1997 | Condreva |
| 5,767,684 A | | 6/1998 | Steennis |
| 5,825,024 A | * | 10/1998 | Badruzzaman ........... 250/269.6 |
| 5,982,181 A | | 11/1999 | Rokunohe et al. |
| 6,087,656 A | * | 7/2000 | Kimmich et al. ......... 250/252.1 |
| 6,297,645 B1 | | 10/2001 | Eriksson et al. |
| 6,313,645 B1 | | 11/2001 | Brandelik et al. |
| 6,418,385 B1 | | 7/2002 | Hücker et al. |
| 6,448,782 B1 | | 9/2002 | Pakonen et al. |
| 6,507,181 B1 | | 1/2003 | Pakonen et al. |
| 6,663,012 B2 | | 12/2003 | Condreva |
| 2003/0168605 A1 | * | 9/2003 | Chambaud et al. ..... 250/370.15 |
| 2004/0158440 A1 | * | 8/2004 | Warburton et al. .......... 702/190 |
| 2004/0263179 A1 | | 12/2004 | Ahmed et al. |

FOREIGN PATENT DOCUMENTS

| | | |
|---|---|---|
| CA | 1162985 | 2/1984 |

OTHER PUBLICATIONS

Endrestøl Principle and method for measurement of snow water equivalent by detection of natural gamma radiation, Hydrological Sciences-Bulletin-des Sciences Hydrologiques, vol. 25, No. 1 (Mar. 1980), pp. 77-83.*

Lundquist, et al., "Meteorology and Hydrology in Yosemite National Park: A Sensor Network Application", F. Zhao and L. Guibas (Eds.): IPSN 2003, NLCS 2634, pp. 518-528, 2003.

* cited by examiner

APPARATUS AND METHOD FOR MONITORING SNOW WATER EQUIVALENT AND SOIL MOISTURE CONTENT USING NATURAL GAMMA RADIATION

FIELD OF THE INVENTION

The present invention relates to determination of water equivalent of a snowpack over a selected ground area and other possible conditions such as soil moisture content and presence of precipitations, as useful for hydraulic energy management and other activities such as agriculture, forest fire detection and fighting, flood warning and water level control.

BACKGROUND

Information on the snow water equivalent (SWE) of the snowpack is essential to agencies involved in water management, such as power and energy producers like Hydro-Québec. Typically, in Quebec, the snowpack cumulated at the end of winter represents annually some 30% of the total available hydraulic energy. It is also important to detect when the snowpack begin to melt, and from there on, to measure the melting rate. Those data are also of significant importance for other applications or concerns like civil safety (early flood warnings).

One traditional way of assessing the SWE of a snowpack is by boring the snowpack along established snow courses and manually taking measurements. The main disadvantages of those manual measurements are their repetitive costs and inaccuracy especially during the snow melting period. In winter, a high proportion of the snow courses may be attended to only by helicopters, which is an expensive operation. This limits the frequency of the snowpack measurements over a given ground area. Boring samples out of the wet snowpack provides unreliable information, which usually underestimates the SWE. Thus, real time and accurate data on the SWE and on the soil moisture (SM) content especially in the case of frozen soil underneath the snowpack are still a challenge today in spite of many initiatives to develop and test alternative techniques and equipments. Harsh climatic conditions prevailing over northern regions is an additional problem with respect to the equipments.

Snow pillow sensors have been used extensively by the Natural Resources Conservation Service (NRCS). Most of their snow survey sites are located throughout the western United States, as reported in Snotel and Scan, P. Pasteris, NOAA Snowfall Network Observation Workshop, Kansas City, Mo., June 2004. California's water resources depend on the snowmelt-dominated Sierra Nevada and snowmelt rates are measured using snow pillows in the Yosemite National Park as reported by Lundquist and al. in Meteorology and Hydrology in Yosemite National Park: A Sensor Network Application, Springer Berlin/Heidelberg, Lecture Notes in Computer Science, Volume 2634/2003, pp. 518-528. As snow accumulates or melts at the top of the pillow filled with a liquid glycol solution, a pressure is measured and correlated to the SWE. However, operation costs are high for the maintenance of this kind of sensors and their size makes them difficult to install in off-road locations like northern sites in Quebec. De-icing the snow pillows is sometimes a necessary maintenance operation to obtain non bias SWE data.

U.S. Pat. No. 6,313,645 (Brandelik et al.) discloses a method for the determination of the volumetric proportion of liquid water, the thickness of the snowpack and the density of snow. The dielectric coefficient of the snow is measured using a probe consisting of at least three electric conductors. An advantage of this method over previous works based on the dielectric properties of the snow is that measurements are taking place without influences of an air gap which is always present between the instrument cables and the snow and could vary with weather conditions in the range of 0.5 to 3 mm. Two pairs of cables are combined into a single three-wire cable for real determination of the dielectric constant of the snow. However, relating the information on the dielectric coefficient to SWE is difficult since snow presents different behaviours according to its physical properties such as the shape of crystals, the temperature, etc. To be reliable, this technique therefore requires additional information and calibration of the snowpack.

Techniques based on radioactivity measurements are also known for the SWE measurement. One radioactive technique is based on the attenuation of secondary background cosmic gamma radiation. U.S. Pat. No. 5,594,250 (Condevra) mentions that the preferred energy range is 3 to 10 MeV which is a good compromise between the ability of the device to determine the SWE and the size of the detector. Energies below 2.7 MeV include counts from terrestrial background gamma sources, which in this case are discarded as noise and are then not desired by this device. The relative measurement of the gamma ray attenuation by snow is exclusively due to its water content and not due to the air entrapped. A first detector is placed directly at ground level, monitors the variations in cosmic radiation in relation with the depth and characteristic of the snowpack. A second detector, above the snowpack, monitors the variations in cosmic rays unaffected by snow. The simultaneous measurements of the two detectors are compared to derive information on the snowpack.

The need of a second detector increases cost despite the fact that this second detector can be shared between a number of ground detectors at nearby sites. However, a second detector contiguous to the one installed near the ground may be useful to allow anticoincident exclusion of false readings due to the high energy primary cosmic radiation. In U.S. Pat. No. 6,663,012 (Condevra), the attenuation of secondary cosmic radiation in the range of 5-15 MeV is used to detect the soil moisture.

U.S. Pat. No. 4,047,042 (Wada et al.) and U.S. Pat. No. 4,992,667 (Abelentsev et al.) describe similar approaches with devices for measuring moisture content of soil and snow water storage using two neutron detectors. A first neutron detector is positioned at a pre-set depth in the soil and a second neutron detector is positioned at an altitude greater than a maximum snowpack thickness. A gamma radiation detector is needed to subtract the background signal from the soil. The operation of the devices is relatively complex and large deployment is limited possibly due to cost.

The use of artificial radioisotope source radiation like $^{60}$Co to determine the water content of soil and/or the snowpack is also known. For example, Canadian patent No. 1,079,413 (Morrison) describes a precipitation gauge where the radioactive source is put on the ground and detectors are placed above the ground. In the case of U.S. Pat. No. 3,432,656 (Smith et al.), the approach is inverted and consists of placing the artificial source above the maximum snowpack thickness with a radiation detector installed at a preset depth in the soil. Some disadvantages from these approaches are: that relatively large artificial sources are needed and must be free of regulatory constraints or qualified for general licensing; the necessity to provide biological protection to the operators; and the pollution of the environment and the possible disappearance via vandalism. Those serious drawbacks discredit such an approach for large deployment because organizations are now more concerned with the protection of the environment. U.S. Pat. No. 4,614,870 (Morrison) describes the use of small artificial radioisotope sources to detect water content but it has limitations in penetration distance. This method is mainly used for measuring moisture content in several discrete zones of different materials. The use of artificial source for SWE determination has been initially developed a few decades ago and U.S. Pat. No. 3,432,656 (Smith et al.) and U.S. Pat. No. 3,665,180 (Guillot et al.) are among those describing first applications. One interesting feature implemented in the device described by Smith et al. is the possibility of moving the source and the detector to determine the SWE of a larger volume of snow.

Flying large gamma detectors at low altitude over extensive lines (5 kilometers long or more) is another alternative. Initially developed in Russia, as reported by A. V. Dmitriev et al. in Fundamentals of remote methods for measuring snow water storage and moisture content of soil using gamma-radiation of the Earth, 1979 Gidrometeoizdat Publishing House, Leningrad, pp. 281-288, it has been implemented in various countries, including Canada as reported by Grasty et al. in An experimental gamma-ray spectrometer snow survey over Southern Ontario, US/IHD Interdisciplinary symposium on advanced concepts and techniques in the study of snow and ice resources, Monterey, California, Dec. 2-6, 1973, pp. 6.1-1 to 6.1-16, and United States as reported by Carroll et al. in B.E., 1993. A comparison of U.S. and Canadian Airbone Gamma Radiation Snow Water Equivalent Measurements, Western Snow Conference 1983, pp. 27-37. This technique is still in operation over regions of these countries. The main drawbacks of the technique are the complexity of the method and the calibration procedure, the requirement for dedicated and sophisticated equipment including the aircraft, and its high cost. This limits the frequency of the surveys over a specific region.

SUMMARY

An object of the invention is to provide a gamma monitoring apparatus and method for measuring water equivalent of a snowpack or a medium, which overcomes the drawbacks of the prior art apparatuses and methods.

Another object of the invention is to provide a gamma monitoring apparatus for measuring water equivalent of a snowpack over a selected ground area based on absorption by the snowpack of gamma rays emitted by naturally radioactive elements present in soil under the snowpack.

Another object of the invention is to provide such a gamma monitoring apparatus which can provide real time and accurate information on the water equivalent of the snowpack.

Another object of the invention is to provide such a gamma monitoring apparatus which can additionally monitor the soil moisture content.

Another object of the invention is to provide such a gamma monitoring apparatus which may have a low power consumption for a long autonomy and which can sustain harsh climatic conditions.

According to one aspect of the present invention, there is provided a gamma monitoring apparatus for measuring water equivalent of a snowpack over a selected ground area, comprising:

a detector unit installable at a given height above the selected ground area, the detector unit having a collimator defining a field of view to be directed on the selected ground area, and a scintillator coupled to a photomultiplier tube for detecting gamma rays emitted by naturally radioactive elements present in soil under the snowpack and absorbed by the snowpack in the field of view defined by the collimator, the photomultiplier tube having an output for producing a signal having pulses indicative of the gamma rays; and a circuit arrangement having:
measuring means for measuring the pulses in the signal;
registering means for registering the pulses exceeding threshold energy levels in a number of energy windows as gamma counts;
computing means for periodically computing the water equivalent of the snowpack as functions of the gamma counts in the energy windows and the height of the detector unit with respect to ground level;
memory means for storing data representing the computed water equivalent;
transmission means for transmitting the data; and
power supply means for providing power to the circuit arrangement and the detector unit.

According to another aspect of the present invention, there is also provided a gamma monitoring method for measuring water equivalent of a medium over a selected surface area, comprising the steps of:

installing a detector unit at a given distance from the selected surface area, the detector unit having a collimator defining a field of view directed on the selected surface area, and a scintillator coupled to a photomultiplier tube for detecting gamma rays emitted by radioactive elements in an energy spectrum under 3.8 MeV and absorbed by the medium in the field of view defined by the collimator, the photomultiplier tube having an output for producing a signal having pulses indicative of the gamma rays;

measuring the pulses in the signal;

registering the pulses exceeding threshold energy levels in a number of energy windows as gamma counts;

periodically computing the water equivalent of the medium as functions of the gamma counts in the energy windows and the distance of the detector unit with respect to a level of the selected surface area;

storing data representing the computed water equivalent; and controllably transmitting the data for reporting the computed water equivalent.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 3:
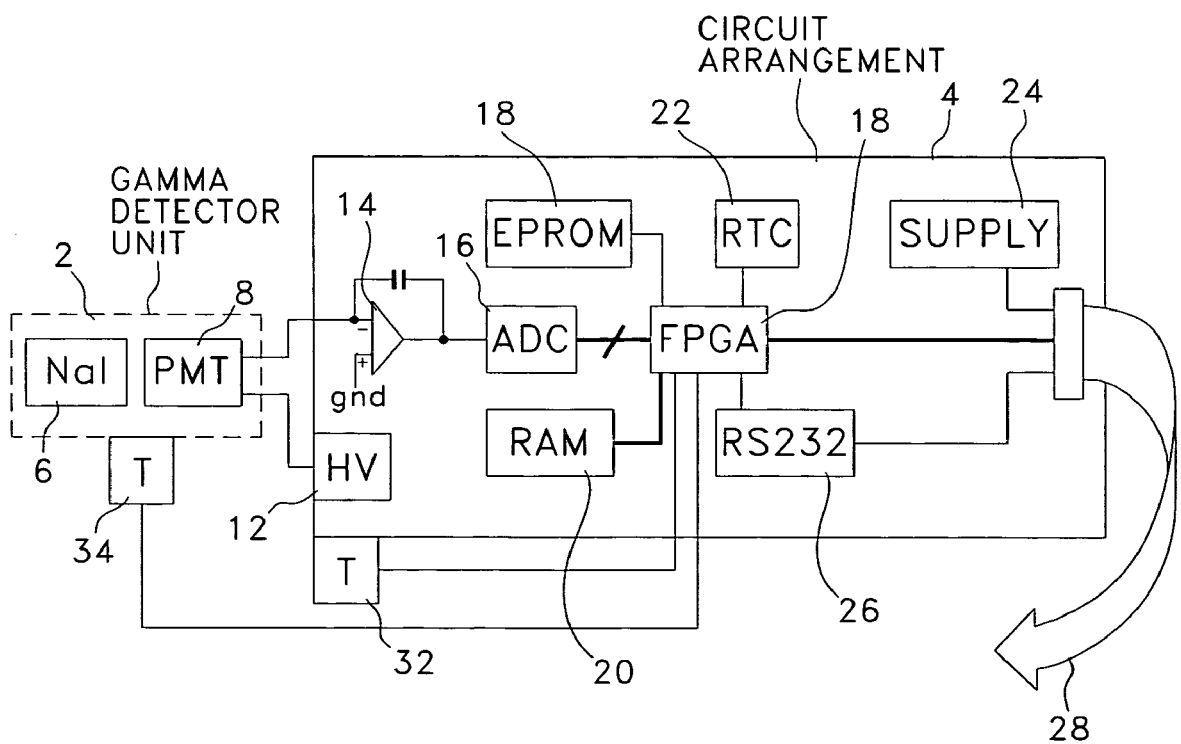
FIG. 3 is a schematic block diagram of a gamma monitoring apparatus.

Referring to FIG. 3, the gamma monitoring apparatus according to the invention comprises a gamma (γ) detector unit 2 and a circuit arrangement 4 for acquiring data corresponding to the signal produced by the detector unit 2, for their transmission, and for carrying out computations based on the data.

Figure 2:
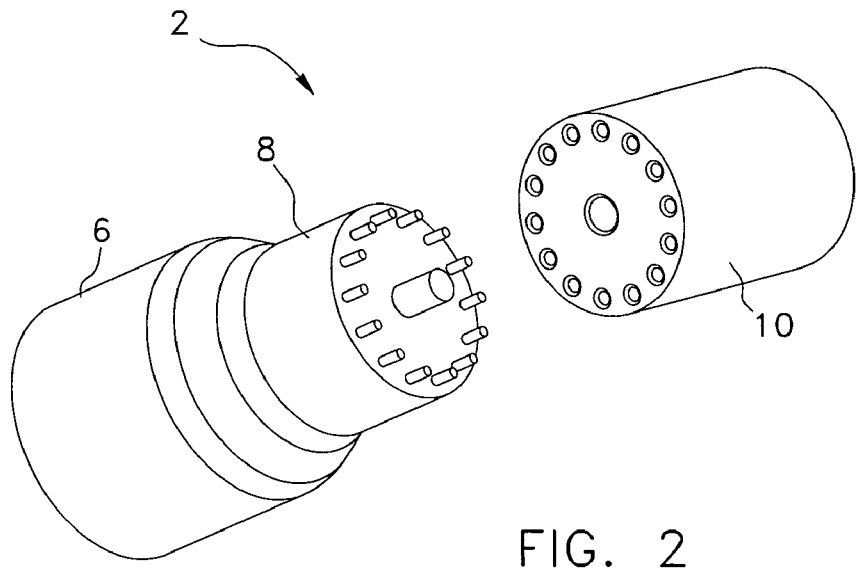
FIG. 2 is a schematic diagram illustrating the detector unit of a gamma monitoring apparatus.

Referring to FIG. 2, the detector unit 2 has a scintillator 6, 8 preferably made of a NaI(Tl) crystal 6 (i.e. a thallium-doped sodium iodide crystal) optically coupled to a photomultiplier tube 8 (MPT) which may include a voltage divider 10. Such a type of scintillator 6, 8 is commercially available for example from the company St-Gobain Crystals & Detectors. Other types of gamma sensitive crystal and other scintillator arrangements may be used if desired, provided that they allow good detection of gamma rays in an energy spectrum under 3.8 MeV.

The crystal 6 may have a cylindrical shape and a 3" by 3" (3 inches by 3 inches) dimension. The shape and size of the crystal 6 may vary depending on the manufacturers and models.

Gamma radiation is naturally produced by low radioactive elements of very long half-lives contained in soil. In the present case, potassium-40 ($^{40}$K) and Thallium-208 ($^{208}$Tl) are among the elements of interest. Potassium-40 emits gammas of 1,460 MeV whereas Thallium-208 emits gammas of 2,613 MeV. These photons may penetrate deeply in the matter without reacting. But there is still a probability of interaction per unit of length. This probability depends on the material (e.g. NaI for the detector unit 2 and water for the snowpack or other medium) and the energy of the gamma. The net effect is that a portion of the total number of emitted radiation is absorbed by the matter or reduced in energy. The accurate measurement of this absorption allows indirectly evaluating the amount of matter between the gamma source and the detector unit 2, hence the possibility of measuring the water equivalent of a snowpack with the apparatus.

Referring back to FIG. 3, the circuit arrangement 4 has a high voltage power supply 12 capable of producing a high voltage, for example 950 Volts, for the photomultiplier tube 8. A charge amplifier 14 for the photomultiplier tube 8 is arranged to integrate the current pulse produced by each gamma in the detector unit 2. The amplifier 14 produces a signal having an amplitude proportional to the integrated charge. The amplifier 14 thus forms an integrator arrangement which is continuously discharged with a time period (RC constant) much longer than the duration of a scintillation (e.g. 300 nanosecond) of the detector unit 2. An analog-to-digital converter 16 (e.g. 14 bits, 29,4196 MHz) converts the charge signal in a digital signal for subsequent processing by a processor unit 18. The processor unit 18 may be formed of a field programmable gate array (FPGA) or any other component or arrangement of components capable of performing signal processing functions. In the case of a FPGA, it can contain a microprocessor core (not shown) for arithmetic computations. The processor unit 18 is capable of measuring the pulses in the signal, of registering the pulses exceeding threshold energy levels in a number of energy windows as gamma counts, of periodically computing the water equivalent of the snowpack as functions of the gamma counts in the energy windows and the height of the detector unit 2 with respect to ground level. The circuit arrangement 4 further has memory units 18, 20 for storing data representing the computed water equivalent and storing operating code and parameters (e.g. EPROM memory unit 18) and storing temporary computation data (e.g. RAM memory unit 20). A real-time clock (RTC) 22 provides accurate timing signals for circuit timing and synchronization purposes. A power supply circuit 24 which may include voltage rectifiers (not shown) provides power to the components of the circuit arrangement 4 and to the detector unit 2. The circuit arrangement 4 further has a transmission circuit 26 for transmitting the data and for other possible communication purposes, for example for programming the FPGA 18, setting the parameters of the circuit arrangement 4, etc. The transmission circuit 26 may be formed of a RS-232 port or any other communication circuit allowing communication with the apparatus if desired. Connection of the circuit arrangement 4 to a transfer card (not shown) for secure passage of the data signals may be done through a flexible cable 28. The components of the circuit arrangement 4 may be conveniently mounted on a printed circuit board (PCB) 30 (shown in FIG. 8). The circuit arrangement 4 may be designed for analog processing of the signals instead of for digital processing if desired.

A local temperature sensor 32 mounted on the PCB 30 and a remote temperature sensor 34 mounted on the detector unit 2 are preferably provided for gain correction purposes. The circuit arrangement 4 may in this respect have a compensating circuit, implemented for example in the processor unit 18, for correcting effects on the gamma counts resulting from a variation of temperature measured by one or both temperature sensors 32, 34.

The apparatus is capable of measuring and reporting many times a day (e.g. four or another desired frequency) on the SWE and SM content of a selected ground area.

Figure 9:
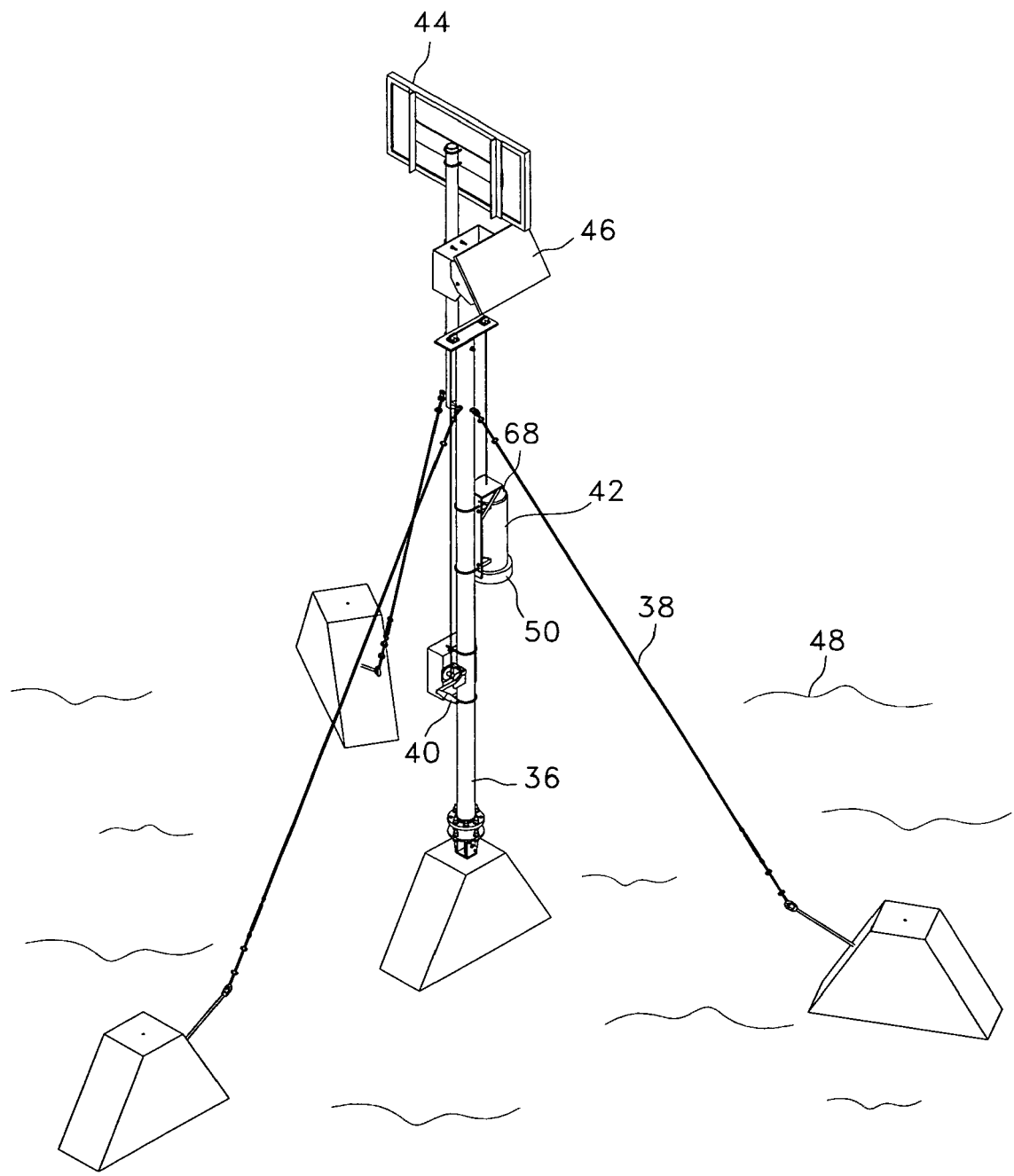
FIG. 9 is a schematic diagram illustrating an installation of the gamma monitoring apparatus.

Referring to FIG. 9, the gamma monitoring apparatus is intended to be installed and thus is installable above the maximum snowpack thickness. In this respect, the apparatus may be mounted on a pole 36 vertically maintained using a stay arrangement 38. The pole may be equipped with a winch 40 for raising and lowering the assembly 42 including the detector unit 2 and the circuit arrangement 4 (shown in FIG. 3) of the gamma monitoring apparatus. The pole may also be equipped with a solar battery unit 44 for battery charging purposes and an antenna 46 for communication purposes. The apparatus measures the absorption of the natural gamma radiation through the snowpack 48.

Referring back to FIG. 3, the detector unit 2, which can be a conventional thallium doped sodium iodide scintillator NaI (Tl) as indicated above, is coupled to custom electronics, formed of the circuit arrangement 4, that record and analyze the gamma ray energy spectra. The digital signal processor 18 proceeds to the analysis and the accurate calculations of SWE and SM. These calculations are based on the absorption by the snow cover of the gamma rays emitted by the naturally radioactive elements present in soil and among them, Potassium and Thallium ($^{40}$K, $^{208}$Tl). The upper limit of the gamma spectrum considered for the data analysis is above 3 MeV, typically 3.8 MeV.

The circuit arrangement 4 of the apparatus forms a sophisticated custom readout and processing electronic system dedicated to acquire, analyze, store and transmit the data pertaining to SWE and SM. The apparatus may be arranged to be also able to store the raw data in the form of histograms on a daily basis in the non-volatile memory unit 18 for a period of many years. Recent developments of NaI(Tl) scintillators, using optical gels to join the NaI(Tl) crystals to the photomultiplier tubes (PMT), enables them to operate properly and without damage at very low temperatures (−40° C.). The NaI(Tl) crystal should however not be exposed to temperature gradients exceeding 8° C. per hour. So, thermal management in the apparatus is provided to satisfy such requirements when the apparatus is intended to be operating outdoors in hostile weather conditions as found in northern Quebec. Combining the thermal inertia of the apparatus, a superior insulation of the detector unit 2 with a silica gel material developed for the NASA, and heat generated by the electronics, the apparatus can operate reliably in the worst climatic conditions from −50° C. to +45° C. where temperature inside the apparatus never falls below −40° C. The apparatus has a low power consumption so that it can be powered with solar panel recharged batteries. The apparatus can transmit the cumulated data typically once a day over satellite or other type of communications towards a remote data center. Predefined transmitted reports include the SWE, and may also include the SM, a precipitation indicator value, the crystal average temperature, and possibly additional information such as electronic temperature, data quality indicators, self-diagnostics information and gamma count numbers. It can run unattended in remote locations for many years without maintenance. The apparatus is equipped with a lead collimator 50 (shown in FIG. 8) or a collimator made of another material if desired, defining a field of view of 120 degrees. This corresponds to a rather large measured area on the ground (50 to 100 m$^2$). The collimator also contributes to reduce the effect of cosmic radiation on the data processed by the apparatus. The field of view may be larger or smaller if desired.

It is difficult to get a direct accurate measurement of the SWE because the physical properties of the snow vary with the weather conditions. Being a mixture of three components, namely water, ice and air, snow can take a multitude of forms with densities ranging from 0.1 g/cc for dry snow to 0.4 g/cc or higher for wet snow. With the apparatus, it is not necessary to know either the density or the thickness of the snowpack to evaluate the SWE. The apparatus measures the absorption of the natural soil gamma emission at energy lower than 3.8 MeV. The gamma absorption depends on the mass of water between the source (the soil) and the radiation detector unit 2. As described in Ion Beam Handbook for Material Analysis, Mayer et al., Academic Press Inc., N.Y. San Francisco, London, 1977, and in The Atomic Nucleus, Evans, International Series in Pure and Applied Physics, McGraw Hill, New York, 1955, the attenuation of the gamma emission by water is not influenced by the physical morphology of the water. This means that one gram of water, be it snow, ice, liquid water or water vapour, will attenuate the gamma flux in the same way.

Figure 1:
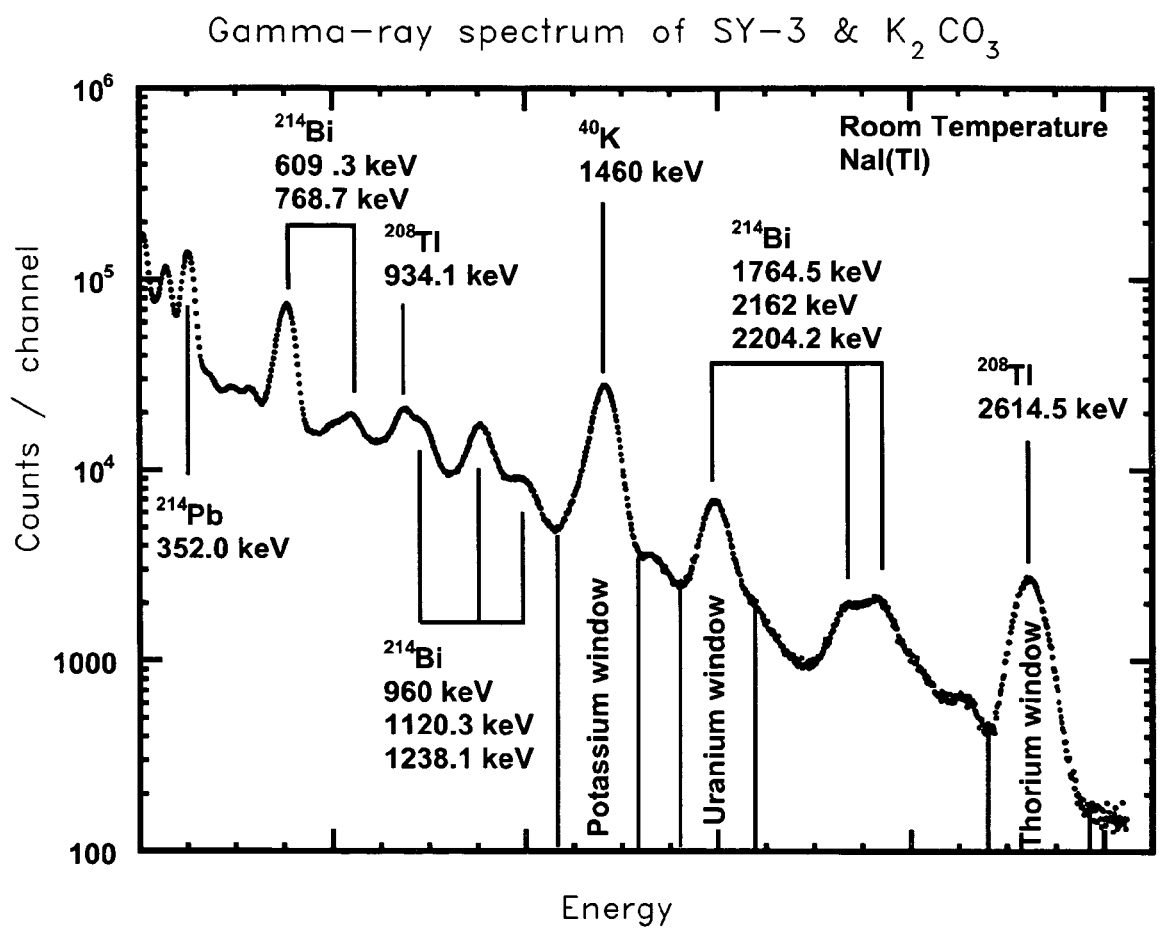
FIG. 1 is a graph illustrating a typical gamma spectrum obtained from samples used to calibrate the gamma monitoring apparatus according to the invention.

Energy windows or gates can be defined to integrate counts or hits associated to the partial or complete energy transfer of an incident γ-ray to the detector from radioactive sources such as the Potassium-40 (1,460 MeV) and Thallium-208 (2,613 MeV) as illustrated in FIG. 1. In the present gamma monitoring apparatus, five gates are preferably used in this respect to determine the SWE (and the SM content if desired). The gates can be defined as shown in Table I, according to channels implemented in the custom electronics of the circuit arrangement 4. Table I also shows gates which can be allocated to define a cosmic window. The channels define respective energy bands covering an energy spectrum including the bands of the naturally radioactive elements.

TABLE I

| Window | Channels | MeV |
|---|---|---|
| Large window | 15 to 497 | 0.089 to 2.96 |
| Restricted window | 75 to 497 | 0.45 to 2.96 |
| Potassium ($^{40}$K) window | 225 to 275 | 1.34 to 1.64 |
| Bismuth ($^{214}$Bi) window | 276 to 325 | 1.65 to 1.94 |
| Thallium ($^{208}$Tl) window | 410 to 480 | 2.44 to 2.86 |
| Cosmic window | 497 to 600 | 2.96 to 3.57 |

The gamma energy range of interest for the apparatus is below 3 MeV and mainly located in the 0.15-2.86 MeV zone. Higher energy range may also be considered if desired, for certain reasons mentioned herein below. The cosmic window is unnecessary for SWE and SM determination, but can be used for other purposes if desired, as it will become apparent herein below. Each window has a position and a width for registering gamma counts corresponding to the desired radioactive element.

In order to increase the reliability and the accuracy of the results, the energy background may be removed and the gamma counts of the signal coming from the gamma decay of higher energy elements which contaminate lower energy windows may be stripped. To this effect, a circuit conveniently implemented by the processor unit 18 of the circuit arrangement 4 may determine the energy background in the energy windows and remove it from the energy windows. For example, improvements on the accuracy of SWE and SM data can be obtained by stripping the energy contamination of the Thallium-208 and Bismuth-214 into the Potassium window and stripping the cosmic contamination into the Thallium and Potassium windows. Such stripping function can be implemented by a circuit conveniently implemented in the processor unit 18.

Another improvement in data analysis may consist in centering both the Potassium-40 centroid to a predefined corresponding channel, e.g. channel 245, and the Thallium-208 centroid to another predefined corresponding channel, e.g. channel 438, after application of a temperature gain shift. The centroids of the gamma counts corresponding to the selected radioactive elements may be periodically determined by a circuit conveniently implemented in the processor unit 18 and the centroids may then be centered on predefined corresponding channels. Doing this process called "rebin" before integrating the number of hits inside a target window whatever the data cleaning process used to reduce or eliminate the signal contamination improves the reliability of the SWE and SM data over time since this process ensures that the resulting gain shift will never be higher than one or two channels for the Potassium-40 centroid. The "rebin" process may be carried out cyclically, for example each 6 hours, and the last 24 hours data (or another time period) which were temperature gain shift compensated at a frequency of one second (or another appropriate frequency) using the circuit arrangement 4 can be used. A temperature-gain look-up table providing a corrective factor as a function of temperature following the relation shown in FIG. 7 may be used so that the "rebin" process defines accurately a selected peak centroid channel position achieving reliable and comparable results for each gamma monitoring apparatus. Computations providing the corrective factor as a function of temperature may be used instead of a look-up table if desired.

The apparatus may be configured to store 1) the raw or the rebin data forming histograms on a day basis, 2) the 6 hours resolution detected gamma counts cumulated during the previous 24 hours for different energy windows of interest for SWE and SM determination, 3) SWE and SM results, 4) a 6 hours resolution precipitation indicator value, 5) the crystal and electronics temperatures, and 6) self-diagnostic data in its non-volatile memory 18. Some data such as SWE, SM and crystal temperature may be automatically sent to a remote data center, but all the data can be accessed remotely.

Referring to FIG. 2, there is shown a gamma detector unit 2 corresponding to a commercial 3×3 inches NaI(Tl) 6—photomultiplier 8—voltage divider 10 assembly capable of operating at very low temperatures. To prevent possible damages to the crystal 6, it is recommended to avoid exposing the crystal 6 to temperature changes exceeding 8° C. per hour. One drawback with a NaI type detector is the gain shift with temperature variations since the scintillation process and the photoemission rate of the photocathode are temperature dependant. A simple way to minimize the temperature influence is to keep the detector temperature constant. However, this may not be possible when the apparatus is used in harsh weather conditions.

Figure 4:
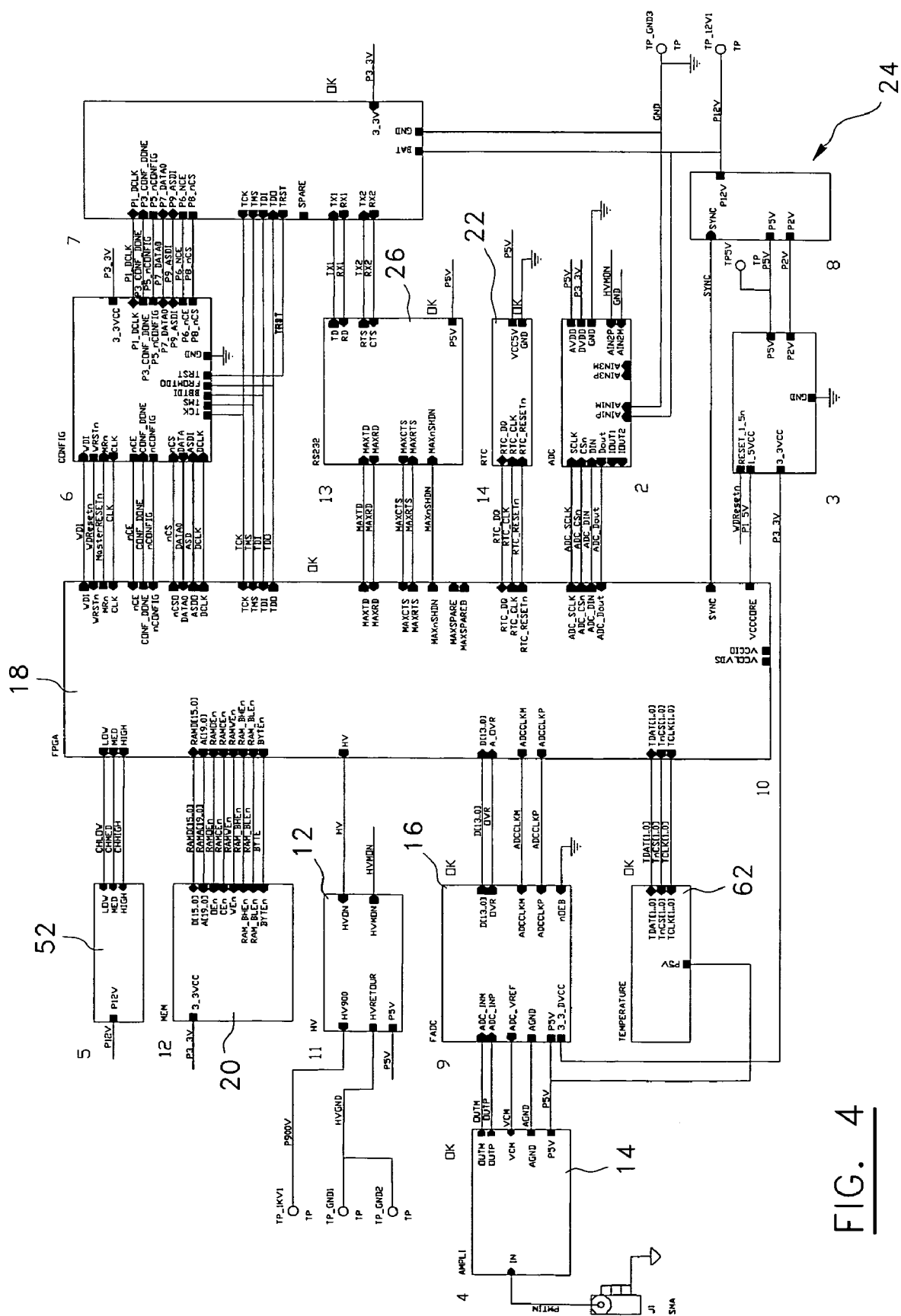
FIG. 4 is a schematic diagram illustrating a circuit arrangement of the gamma monitoring apparatus.

Referring to FIG. 4, there is shown a possible circuit design for the circuit arrangement 4 of the gamma monitoring apparatus. The FPGA 18 automatically adjusts the gain shift according to temperature variations. To keep the temperature variations inside the recommended 8° C./hour limit when the apparatus is exposed to harsh weather variations, the apparatus may be provided with a heating unit 52. During very cold spells or in cases of rapid temperature changes, operation of the heating unit 52 is controlled by the FPGA 18 to draw current and generate heat to maintain the minimal required internal temperature (−40° C.) or the 8° C. temperature gradient. The heat may be transmitted from the heating unit 52 to the detector unit 2 through a heat conductive tubular element 54 (shown in FIG. 8).

Figure 5:
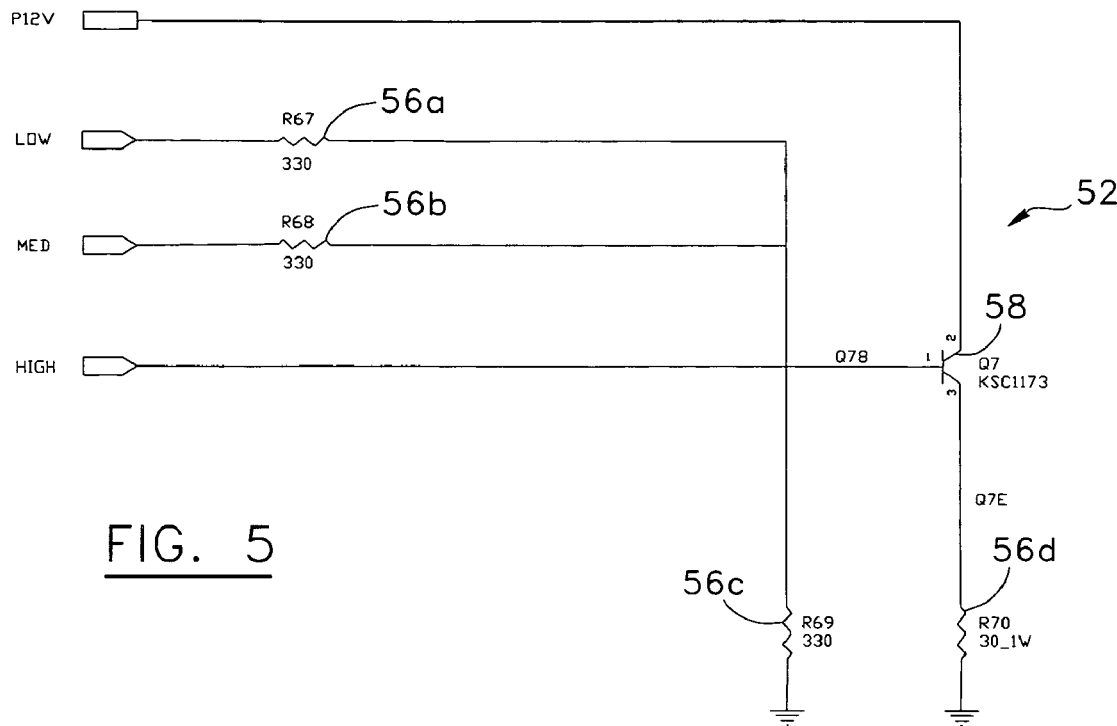
FIG. 5 is a schematic diagram illustrating a heating circuit of the gamma monitoring apparatus.

Referring to FIG. 5, for optimize energy management, the heating unit 52 may be conveniently formed of a three level (low, medium, high) power heating circuit formed of an arrangement of selectable heat dissipating resistors 56a, 56b, 56c, 56d and a transistor 58 mounted on the PCB 30 (shown in FIG. 8) of the apparatus. In the illustrated embodiment, the available heating power output ranges from 0.25 to 1 Watt. Military electronic components supporting very low temperature as low as −55° C. may be used. Selection of the operative heating circuit may be performed through the FPGA 18.

Figure 6:
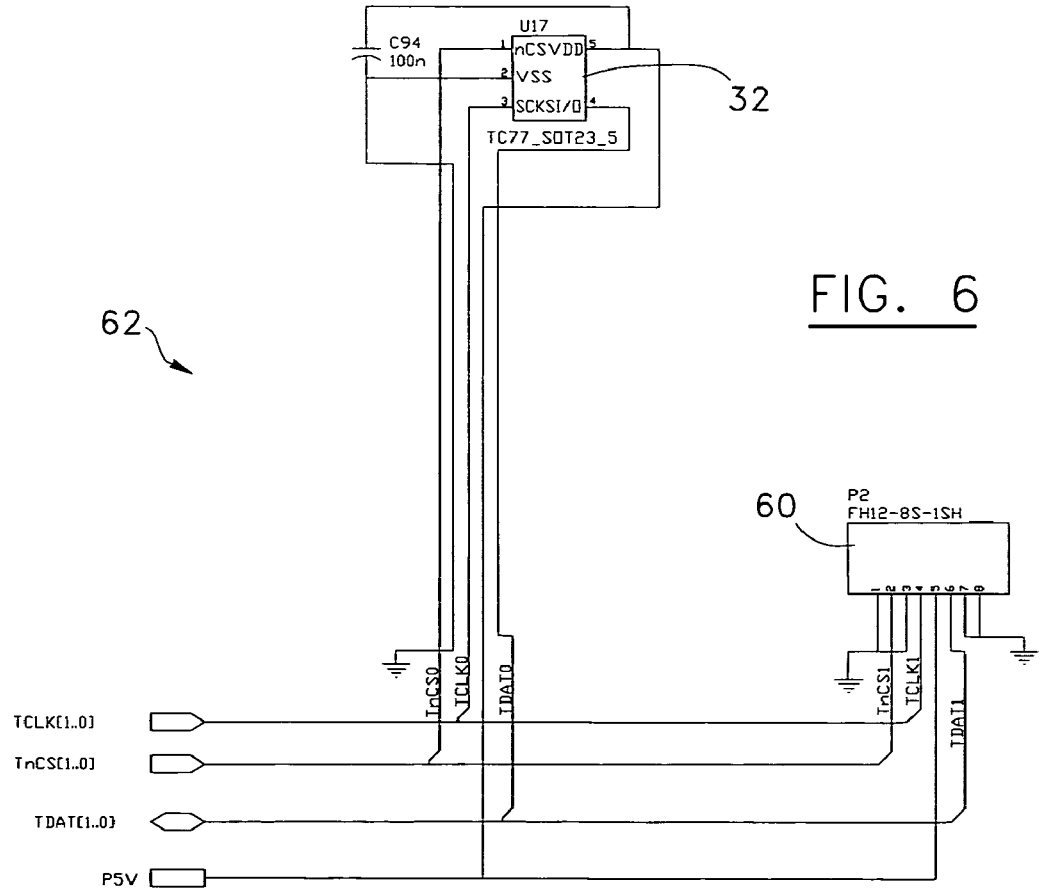
FIG. 6 is a schematic diagram illustrating a temperature sensing circuit of the gamma monitoring apparatus.

Referring to FIG. 6, there is shown a possible temperature sensor/encoder circuit 62 for the apparatus. The circuit has a (flat) connector 60 for connection to the temperature sensor 34 mounted on the detector unit 2 (shown in FIG. 3). The connector 60 and the temperature sensor 32 of the electronics are both connected to the FPGA 18 (shown in FIG. 3).

Referring again to FIG. 3, despite the thermal management incorporated in the apparatus, the detector unit 2 could be exposed to large temperature variations and the gain must be corrected in real time. The technique used in the apparatus for gain compensation may be different from the standard techniques which usually require a reference line beyond the range of the pertinent data. In standard techniques, a closed loop circuit is used to lock the reference line. The reference is supplied by either a light pulser optically coupled to the photocathode of the detector unit or a radioactive source. Light pulses also show some temperature dependency, and there are no convenient radioactive sources with energies higher than the Thallium line. The Thallium line itself has too low a data rate to be of any use in a closed loop stabilization system.

Figure 7:
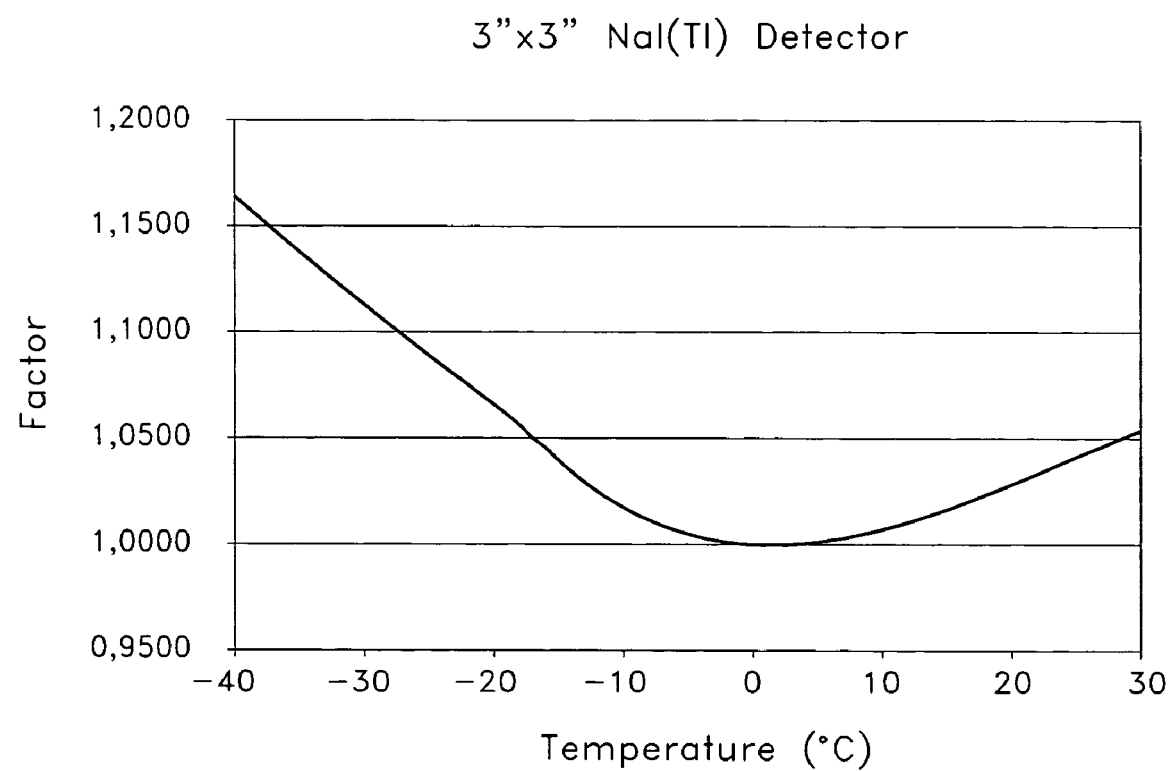
FIG. 7 is a graph illustrating a compensation factor as a function of temperature.

In the present gamma monitoring apparatus, the correction or gain adjustment of the detector unit 2 following the relation shown in FIG. 7 is preferably achieved numerically by the firmware of the circuit arrangement 4 once per second (or at another frequency if desired) using the temperature data measured by the custom electronic circuit with the probe 34 placed inside the inner brass or aluminum tubular element or cylinder 54 (shown in FIG. 8) of the assembly directly on the crystal encapsulation. The pulse shape of the photodetector signal may also be digitized numerically at a rate of 30 megasamples per second which allows for in-situ real-time correction.

Figure 8:
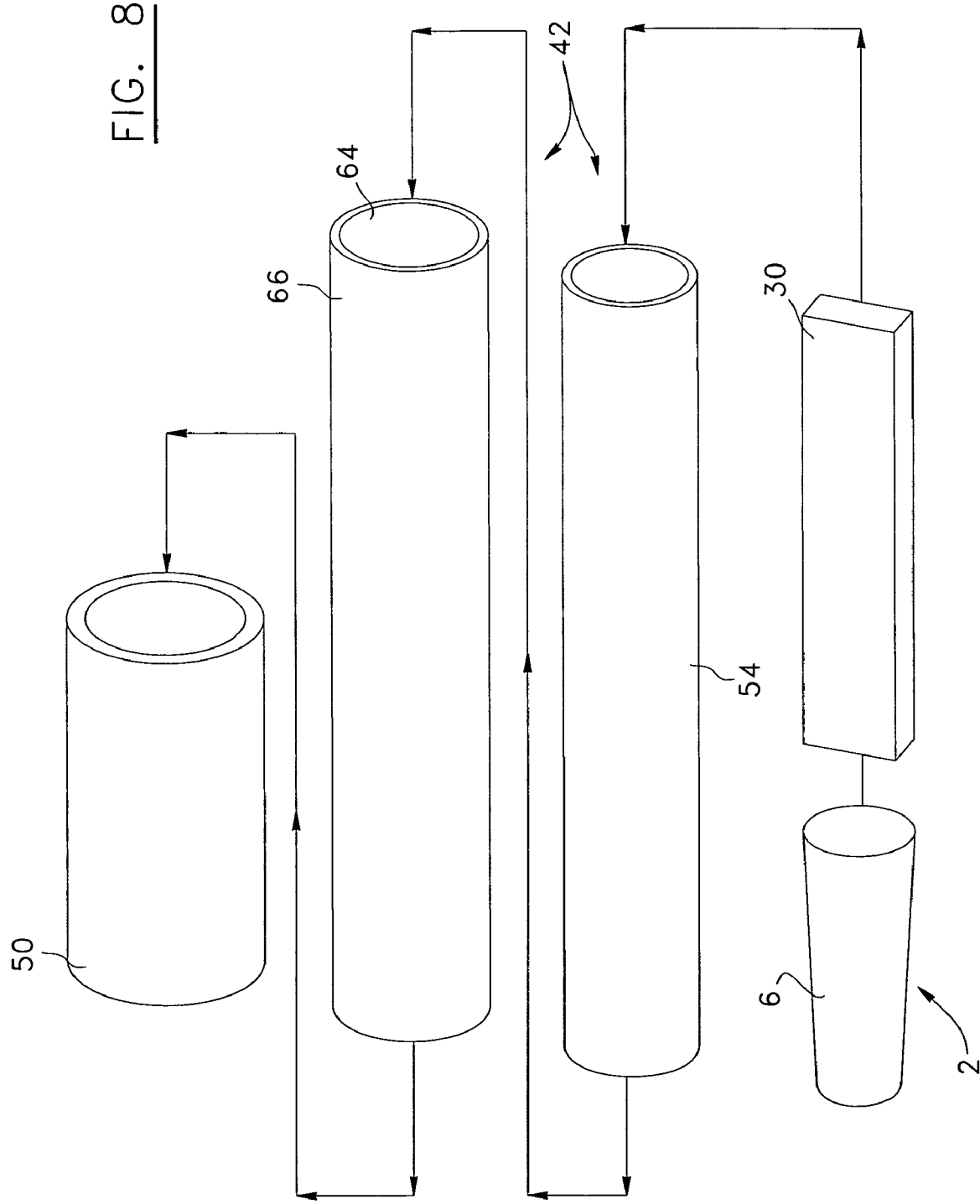
FIG. 8 is a schematic diagram illustrating an assembly of the gamma monitoring apparatus.

Referring to FIG. 8, the gamma monitoring apparatus may consist of a tubular enclosure assembly 42 housing the scintillator 6 of the detector unit 2 and the PCB 30 supporting the circuit arrangement 4 (shown in FIG. 3). The collimator 50 of the detector unit 2 preferably has an annular shape (other shapes may however be used if desired). The tubular enclosure assembly 42 has an end inside which the scintillator 6 extends and around which the collimator of the detector unit 2 axially projects, as best shown in FIG. 9. A thermal insulation 64 is preferably provided to insulate at least the scintillator 6 of the detector unit 2 inside the tubular enclosure assembly 42. The tubular enclosure assembly 42 may conveniently be formed of an outer tubular element 66 receiving the inner tubular element 54 into which the scintillator 6 and the PCB 30 (or the circuit arrangement 4 shown in FIG. 3) extend. The thermal insulation 64 extends between the inner and outer tubular elements 54, 66. The outer tubular element 66 is preferably made of anti-corrosive material such as aluminum, while the inner tubular element 54 is preferably made of heat conductive material such as brass or aluminum for transfer of the heat produced by the circuit and the heating unit 52 (shown in FIG. 4) to the scintillator 6. In this respect, the circuit arrangement 4 preferably extends adjacent to the scintillator 6. The tubular enclosure assembly 42 can thereby contribute to mechanically protect the detector unit 2 and the PCB 30 while allowing diffusion of the heat produced by the PCB towards the scintillator 6.

The insulation 64 and the heat generated by the electronics and when required by the power heating unit 52 help preventing an inside temperature gradient higher than 8° C. The internal temperature may thus be successfully controlled even during extreme cold spells down to −50° C.

The inner tubular element 54 may also provide a supplementary protection of the electronics against humidity. In order to reduce heat loss and protect the inner tubular element 54 from corrosion when brass is used, an external air-tight aluminum cylinder as the tubular element 66 may be used. A thin aluminum foil (e.g. 0.8 mm) may be used to cover the end of the tubular element 66 where the scintillator 6 is located as a compromise between mechanical protection and maximum transmission of the gamma rays to the detector unit 2.

The thermal insulation 64 is preferably made of a silica gel material filling the free space between the inner and outer tubular elements 54, 56. The silica gel material may be Nanogel™ commercially available from the company Cabot. Such material constitutes a high performance insulating material that provides an excellent thermal protection. It consists of IR opacified aerogel silica beads having a nanoporous structure and a size distribution centered around 1 mm in diameter. The nanoporous structure of this material reduces considerably the heat transfer by reducing the frequency of the collisions between gas molecules. Other thermally insulating materials may be used if desired.

The external mechanical structure of the assembly may be completed with an aluminum top cover 68 (shown in FIG. 9) on which electric and communication connectors are installed to allow RS-232 communication to be used to set the parameters in the firmware and to retrieve the data. High speed baud rate transmission is thus available to download the raw data (histograms). The connectors may be positioned at other locations on the assembly and other communication standards can be used instead of RS-232 if desired.

Referring to FIG. 9, the collimator 50 is mounted at the bottom of the outer element 66 wrapping the NaI(Tl) crystal 6 (shown in FIG. 8). The collimator 50 has two main functions, a first one being to partially shield against cosmic and ambient radiations, a second one being to set the target ground surface or area. Since the bottom end of the collimator 50 has a field of view of 120 degrees (or another angle if desired), adjusting the height of the apparatus with respect to ground automatically defines the prevalent target surface.

Referring again to FIG. 3, a 3-steps calibration process may be applied to each gamma monitoring apparatus before deployment for example at meteorological stations or nivometric stations. The first step is carried out by roughly adjusting the detector photopeak energy response to a Cesium-137 ($^{137}$Cs) source at the desired channel position and/or with a source of Potassium-40 ($^{40}$K) from $K_2CO_3$. The $^{137}$Cs 662 keV gamma ray is useful to determine and verify the resolution of the detector unit 2. The manufacturer guarantees a Full Width Half-Max (FWHM) resolution of 7.5% for a 3×3 inches NaI(Tl) detector. From experimentation, it has been learned that such detectors have a resolution typically better than 48 keV or 7.3% which is calculated from the FWHM. Manufacturer's information about the resolution and the experimentation results are therefore in agreement. This rough adjustment can be carried out using a potentiometer (not shown) disposed on the voltage divider base 10 (shown in FIG. 2).

As the second step of the calibration process, artificial radioactive sources can be used to ensure a precise fit between channel numbers and energy levels. Among sources, Cobalt-60 ($^{60}$Co, 1,1732 and 1,3325 MeV), Cesium-137 ($^{137}$Cs, 662 keV), Potassium-40 ($^{40}$K, 1,460 MeV) from potassium carbonate ($K_2CO_3$) and a Syenite Rock sample coded SY-3, which simulates the natural radioactivity of the soil, are frequently used. SY-3 is a geologic standard sample coming from the OKA area in Quebec and certified by the Canadian reference material. Its composition is well known, see e.g. Gladney et al., 1988 Compilation of elemental concentration data for CCRMP reference rock samples SY-2, SY-3 and MRG-1, Geostandards Newsletter, (1990), Vol 14 No. 3 pp. 373-458, and contains among other elements: 650±55 ppm Uranium; 1003±83 ppm Thorium; 202 pCi/g of Radium and 1.5±0.6 ppm Thallium. A typical gamma-ray spectrum obtained during the calibration is illustrated in FIG. 1. The various peaks of interest for calibration are easily identifiable and well defined: Lead-214 ($^{214}$Pb, 352 keV), the Bismuth-14 ($^{214}$Bi, 609 keV), the distinctive peak of Potassium-40 ($^{40}$K, 1,460 MeV), the Bismuth-204 ($^{204}$Bi, 1,768 MeV) and the Thallium-208 ($^{208}$Tl, 2,613 MeV).

The third step of the calibration process is to characterize the efficiency response. In this respect, all the gamma monitoring apparatuses are considered identical in terms of counts efficiency response if an individual apparatus does not deviate over a standard deviation of 2% from the average population. For this test, a specially designed testing bench test (not shown) has been used with a Cobalt-60 ($^{60}$Co) source sitting at one end while the apparatus subjected to the test sits horizontally at 1.6 meter at the other end. This simple test allows the measurement of the total efficiency of the gamma monitoring apparatus, thus ensuring that they are all completely similar.

After completion of the full calibration procedure, the gamma monitoring apparatus can be installed at a field site for a very long period of time without maintenance. The apparatus may have a non volatile memory of 8 Mbytes to ensure recorder autonomy for more than 5 years of operation. This autonomy can reduce operating costs especially for weather stations located in the north where helicopters are often the only way to reach the site. Collecting raw data can be done in-situ or remotely with the serial RS-232 protocol by using compatible satellite or modem communication. The complete set of data or just the required information can be sent to the remote site at a pre-defined time of the day because the apparatus has its own internal clock. With all those features, the apparatus can operate without a data logger to store and calculate SWE and SM, another possible economic advantage considering the price of data loggers. However, if a data logger is needed for any other reasons like attending other sensors at a weather station, the apparatus may be designed to be compatible with such a data logger.

Referring to FIG. 9, the apparatus may be of a battery power configuration type, for example when powered with a 12V-100 Ah lead-acid battery (not shown) which is recharged with a 80 W solar panel 44. Since the power consumption of the apparatus is around 2 W, the energy autonomy is high enough even when it is raining or snowing for a full week and no battery recharge is achieved during that time.

Referring again to FIG. 3, the custom data acquisition electronic system design preferably follows the "system on a chip" approach. The FPGA 18 can be an Altera Cyclone FPGA combining the time critical firmware modules and a NIOS-II 32-bit microprocessor core. The signals coming out of the gamma detector unit 2 can be sampled continuously by the firmware at 30 mega samples/sec with a 14-bit pipelined analog-to-digital converter (ADC) 16. The sampling process may include filtering, pulse shaping, hit detection, charge evaluation, gain compensation as a function of temperature, and storing the raw data onto the non volatile memory 18. In spite of a continuous data acquisition at a sampling rate of 30 mega-samples per second, a relatively low electric consumption of the apparatus is possible using multiple switching DC to DC converters (not shown) in the power supply unit 24.

The NIOS-II embedded processor may be configured to run a program that controls the long term run sequences, the calculation of the SWE of the snowpack and the SM, the transmission of the data over the communication link, and the servicing of unsolicited commands.

Maintenance free service of the apparatus may be achieved by a self-diagnostic built-in feature forming a watchdog system which detects any possible functionality error of the FPGA 18 or software hang up and automatically restarts the firmware and the software to minimize possible data loss.

The gamma monitoring apparatus monitors the gamma rays naturally emitted by the soil. The soil at each site could present vastly different concentrations of radioactive components. As a general but not an exclusive rule, a soil containing inorganic component (stones) will emit more gamma radiation than a soil containing organic components (like peat bog). The gamma monitoring apparatus should detect a minimum number of counts per energy channel window in order to guarantee the desired accuracy. In this respect, verifications have shown that a collection period of 24 hours is generally sufficient to ensure accuracy over all regions of Quebec. The 24 hours sampling period has been selected to get sufficient hits to achieve a deviation of 1% or less in the total count number whatever the energy window used.

When snow cumulates to form the snowpack, the gamma counts (N) from natural radioactive elements present in the top soil layer is attenuated and can be approximated by equation 1 assuming 1) a uniform distribution of the radioactive source and 2) uniform moisture in the soil:

$$N = \left(\frac{N}{1+1.11*M}\right)*\exp(-B_a*(H-SWE)-\beta*SWE) \quad (1)$$

where:

$N_O$ represents the number of gamma counts per unit of time for one given window of energy as if the apparatus is lying on the ground with no snow cover and no available humidity within the soil;

M represents the soil humidity, expressed as the ratio of the mass of water over the mass of the dry soil (% weight);

$B_a$ represents the linear total attenuation coefficient for air at 0° C. and 1013.15 mb (cm$^{-1}$);

β represents the linear total attenuation coefficient for water (cm$^{-1}$);

H represents the height of the apparatus above ground level (cm); and

SWE represents the snow water equivalent (cm).

Equation 1 can be applied to any window in the energy range of interest (0.1 to 3 MeV).

This relation can be also simplified considering that 1) the respective electrons/molecular mass ratio of water (0.555) and air (0.499) and 2) the respective density of air and water at standard temperature (0° C.) and pressure (1013.15 mb). Equation 1 can also be simplified by neglecting the impact of the snowpack on the height of the column of air. This simplification introduces an error which is equivalent in all case to much less than 1 mm of SWE. Equation 2 is then obtained:

$$N = \left(\frac{N_o}{1+1.11*M}\right)*\exp(-\beta*(SWE+0.001165*H)) \quad (2)$$

There is no need to correct Equation (2) for actual air temperature and pressure since such a correction amounts to less than 1 mm of SWE for a gamma monitoring apparatus hanged up at 3 meters above ground level, even under extreme climatic conditions. Such a margin of error on SWE is of no consequence to normal water management applications.

Rearranging Equation 2, SWE can be defined by the following equation:

$$SWE = \left(\frac{-1}{\beta}\right)*\ln\left(N*\frac{(1+1.11*M)}{N_o}\right)-(0.001165*H) \quad (3)$$

Figure 10:
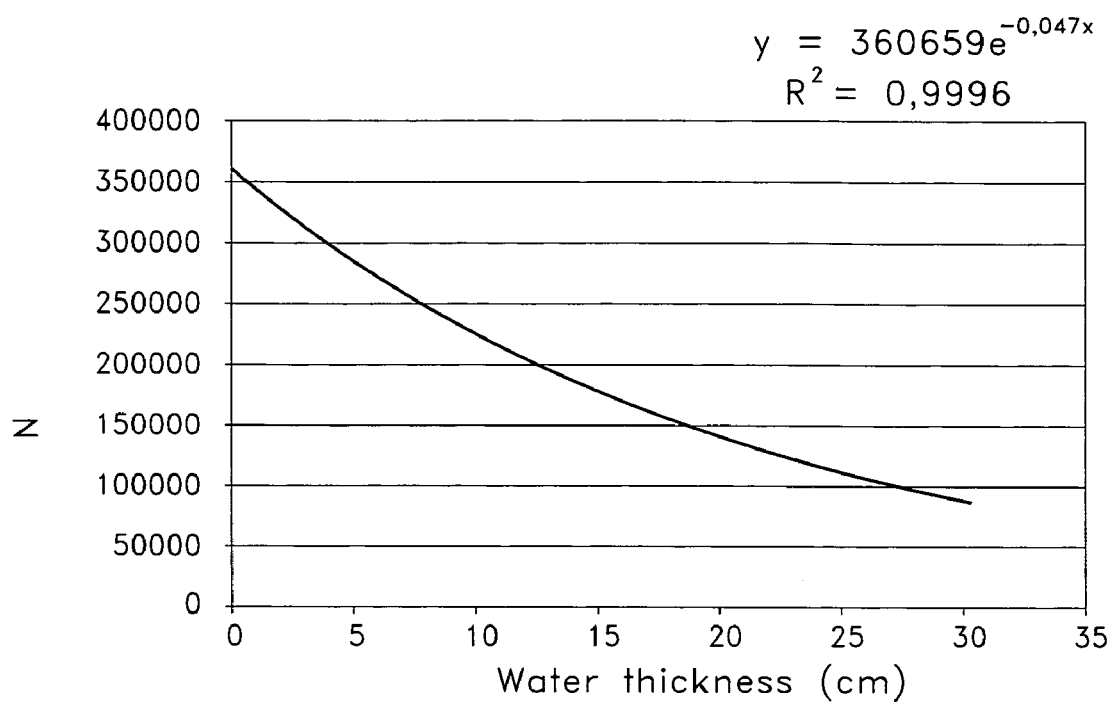
FIG. 10 is a graph illustrating a count number as a function of water thickness in a pool.

The linear total attenuation coefficient for each energy window has been determined by experimentation. The apparatus has been operated for periods of 24 hours or more while hung over a pool containing a precise height of water. This experiment confirms the exponential nature of the relation between the number of counts per unit time and the height of water, as illustrated in FIG. 10. The linear total attenuation coefficient applicable to the selected windows of energy in the gamma spectrum can therefore be estimated as described previously.

In order to correlate the obtained experimental linear total attenuation coefficient values with the expected theoretical values, a numerical model has been built to simulate the behaviour of the apparatus. The model essentially takes into account the cumulative gamma counts issued from unit volumes of ground making up the source area as detected by the apparatus.

The model assumes uniform distribution of moisture in the ground, uniform radioactive properties of the ground and a uniform snow pack both horizontally and vertically. Gamma rays emitted by a single unit volume of ground are attenuated for soil, water (both in the ground and in the snow pack), air, the (lead) collimator 50 and the external cylinder 66. The model approximates the angular response of a NaI(Tl) crystal 6. The linear effective attenuation coefficients calculated by the model are identical, for all practical purposes, to the coefficients derived from experimentation.

The exponential relationship assumption will be verified over time unless the radioactive properties of the soil at the site are modified or unless relevant radioactive materials are transported and deposited on the ground or in the snowpack by the atmosphere. Should this happen, that would introduce an error in the SWE measurements until these new materials are evacuated from the site. Effectively, besides these cases of external contamination, the radioactive emissions at one specific site can be considered constants given the long life span of the radioactive elements considered. One of the most important contributors to the natural gamma ground emission is the Potassium-40 ($^{40}$K) which has a half-life of $1.28 \times 10^9$ years.

Contrary to the attenuation coefficients that can be determined by experimentation in laboratory or by using model simulation, the constant $N_o$ is site specific and should therefore be estimated at each site. A convenient procedure to determine $N_o$ is to proceed in summer, in absence of a snow cover (SWE=0). In such a case, Equation 3 can be simplified to Equation 4:

$$N_0 = N*(1+1.11M)*\exp(\beta*(0.001165*H)) \quad (4)$$

After soil moisture (SM) measurements, this information can be combined with the number of counts recorded by the apparatus and the constant $N_o$ can be evaluated out of Equation 4. Soil moisture measurements can be done in a number of ways. This could be achieved by using humidity sensors buried in the top layer of the ground. Another method is to bore samples out of this top layer of the ground and determine in laboratory the mass of water by differencing the wet and dry soil samples weight, the dry samples being obtained after at least a 24 hours drying period at 120° C.

The gamma monitoring apparatus will usually be hung up at 2 to 3 m above ground level or high enough to be on top of the maximum anticipated snowpack at the site. If soil moisture is assumed to be constant under the snow cover all winter long, then SWE can be reported daily from the number of gamma counts recorded by the apparatus using Equation 3 since β and $N_o$ were previously determined. As described above, the soil humidity can be determined from soil sampling just before the first winter snowfall. In spite of accurate results obtained using this approach, the assumption of a constant soil moisture under the snow pack can be questioned.

Since the apparatus registers counts in more than one energy windows, it is possible to evaluate SWE in absence of any indications on the soil moisture. Mathematically, the combination of Equation 3 applied at two different windows allow for the elimination of the soil humidity (M) parameter in the calculations of SWE resulting in Equation 5:

$$SWE = \left(\frac{1}{\beta_{w1} - \beta_{w2}}\right) \ln\left(\frac{N_{w2} * N_{ow1}}{N_{w1} * N_{ow2}}\right) - (0,001165 * H) \qquad (5)$$

Once SWE has been calculated, Equation 3 can be used to estimate the soil humidity parameter in this equation. For example, introducing $\beta$ and $N_o$ parameters respectively for K and Tl windows into Equation 5 gives SWE data. Then, M can be determined either using Thallium or Potassium window counts according to Equation 3. This approach has the advantage of not making assumptions about soil moisture content and keeping it to a constant value during winter.

The apparatus can also provide an indication of the occurrence of precipitations. The influence of the radio-isotope Bismuth is prevalent in the defined Bismuth window. This Bismuth isotope is a decay-daughter of Radon, itself a radio-isotope in the Uranium decay chain. Radon, as a gas, is emitted in the atmosphere where it diffuses itself in the lower troposphere. Being soluble to water, the atmospheric Radon is washed back to the ground by precipitations, therefore increasing momentarily the count in the Bismuth window. Abrupt and significant increases in the counts associated with the Bismuth window are therefore an indication of the occurrence of precipitations at the site.

Figure 11:
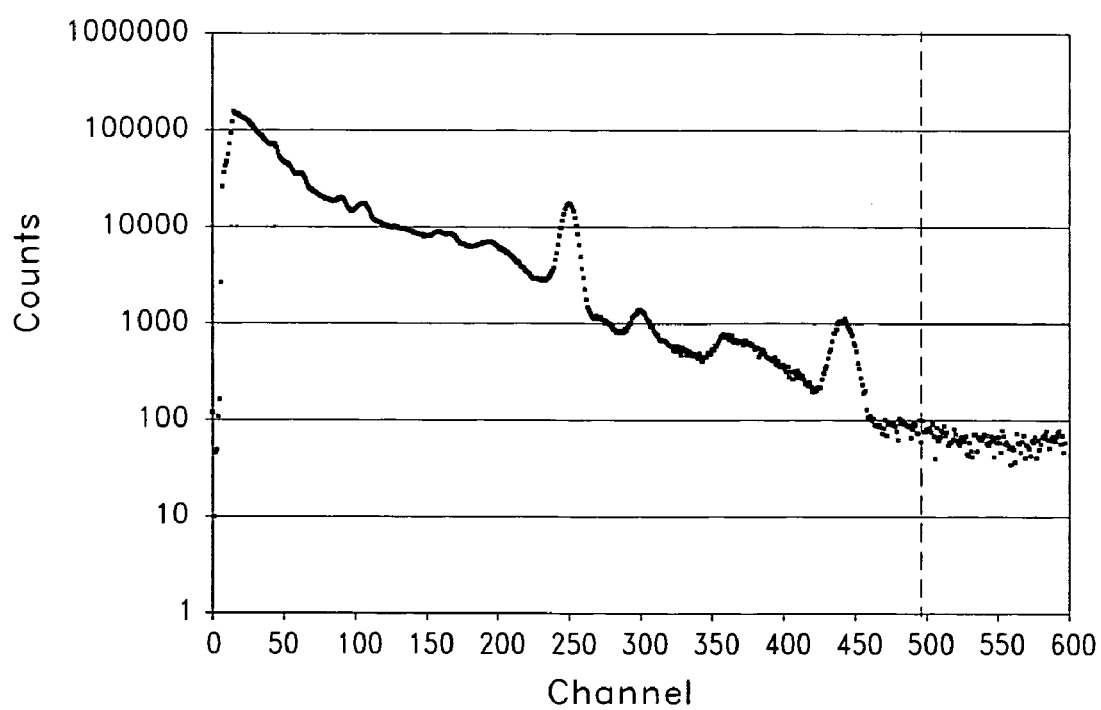
FIG. 11 is a graph illustrating a delineation of a cosmic window with respect to acquisition channels of the gamma monitoring apparatus.

It may be assumed that cosmic radiations will add to the counts originating from ground sources. The question is how significant can the cosmic contribution be in relation with the soil emissions. To answer this question, the apparatus has been installed on top of a 2 inches shield of lead to minimize the radiation originating from ground. Thallium-208 being the radioisotope contained in the soil emitting the most energetic gamma, the portion of the histogram above that energy window has been watched to get an indication of any cosmic contribution. This corresponds to channel 497 and up in FIG. 11. In this portion of the histogram, the apparatus detects some 15 hits per 6 hours period. Such a level of counts is not negligible considering the windows of interests and monitored by the apparatus. After correction on the cosmic background by subtraction, the evaluations of SWE and SM derived from the data are more accurate.

The following provides examples of results obtained while testing the gamma monitoring apparatus according to the invention.

EXAMPLE 1

SWE with K

During a day of winter 2006, a snow survey was realized at an experimental site in Quebec and the SWE of the snowpack was manually measured at 20.0 cm with a standard deviation of 1.5 cm while the gamma monitoring apparatus reported a SWE value of 19.4 with a standard deviation of 1.0 cm. During that 24 hours period, the apparatus detected 84193 hits while, in absence of snow and no humidity in the ground, the number of counts would have been 237000 ($N_0$).

EXAMPLE 2

SWE with the Ratio of K and Tl Windows

At the same site and time as in Example 1, SWE was estimated using the ratio of counts in the Potassium and the Thallium windows. It was calculated at 22.9 cm with a standard deviation of 1.5 cm. During that 24 hours period, the apparatus detected 17273 hits in the Thallium window while, in absence of snow and no humidity in the ground, the number of counts would have been 42000 ($N_0$).

EXAMPLE 3

SWE with Tl Window

Still at the same site and time as in Examples 1 and 2, based on the number of counts in the Thallium window, SWE was estimated at 16.1 cm with a standard deviation 1.0 cm.

EXAMPLE 4

SM from K Window

In November 2007, at another experimental site, soil moisture (SM) was established at 21% with a standard deviation of 5%. At the same time, the 24 hours number of counts in the Potassium window recorded by the apparatus was 412700 which corresponds to an estimates of 22% for SM with a 5% standard deviation. At this site, in absence of snow and for a totally dry soil, the count to be expected for the Potassium window is 530180 counts per 24 hours.

EXAMPLE 5

SM with Tl Window

During the same day and at the same site as in Example 4, the number of counts reported by the apparatus in the Thallium window was 54 908 in 24 hours. This is interpreted as an SM of 20% with a 5% standard deviation. In this case, over a totally dry soil, the expected number of counts would have been 68000.

EXAMPLE 6

SM with Bi Window

During the same day and at the same site as in Examples 4 and 5, the count number of the Bi window was tracked down for each 6 hours period and it was observed that the increase of this number for two consecutive periods is correlated with rain or snow precipitation.

EXAMPLE 7

Figure 12:
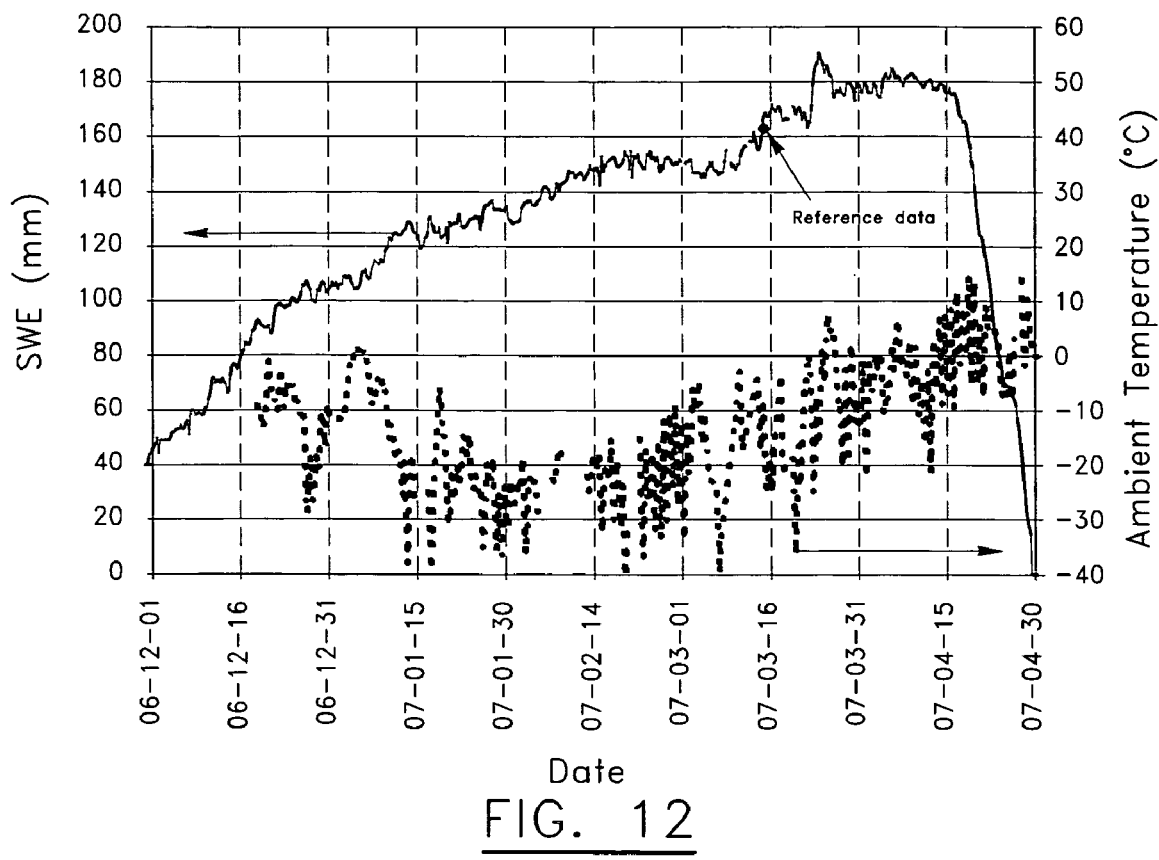
FIGS. 12 and 13 are graphs illustrating examples of SWE and SM results obtained with the gamma monitoring apparatus at a test site.
Figure 13:
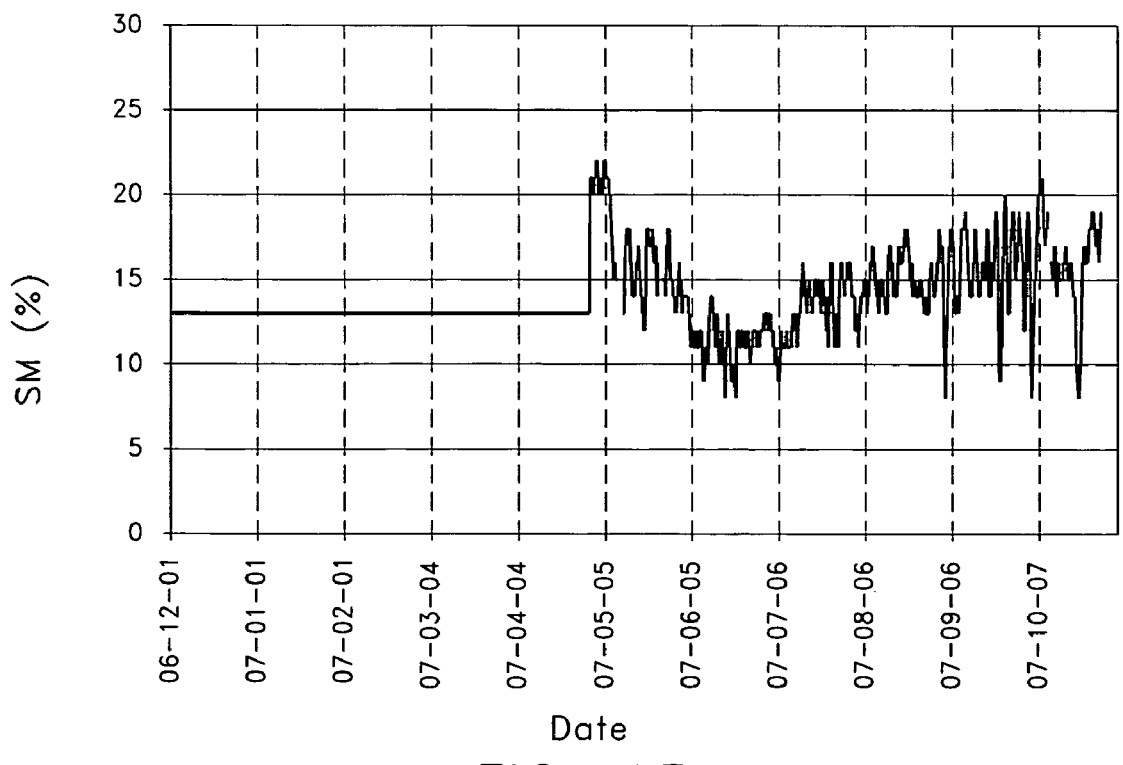

In this example, the SWE and SM data for the years 2006-2007 are reported for an experimental site in the Bay James area, Quebec. The gamma monitoring apparatus started to operate by Dec. 1, 2006 and the temperature sensors 32, 34 started to operate by Dec. 19, 2006. SWE is calculated 1) using Equation 3, 2) the signal counts from the potassium window after removing the background, 3) considering a constant value of M (13%) under the snowpack. FIGS. 12 and 13 illustrate the results. The SM data in the absence of snowpack are determined using the signal counts from the Thallium window. FIG. 12 shows that the apparatus operated even at ambient temperatures near or below −40° C.

EXAMPLE 8

Still at the same site as in Example 7, the $N_0$ parameters of the apparatus were set at 200800 and 26920 counts per 24 hours respectively for the Potassium and the Thallium windows. On Mar. 15, 2007, the counts observed by the apparatus were respectively of 44269 and 15378. The corresponding SWE value out of the ratio of the counts of the two windows is 18.5 cm while manual measurements conducted in parallel at the site indicated a SWE of 16.3 cm and a standard deviation of 2.7 cm.

EXAMPLE 9

A radioactive source of $^{137}$Cs disposed in an open lead cylinder having an internal diameter of 1 cm was oriented to irradiate wet and dry plywood samples and the gamma radiation that were not absorbed by the plywood was then measured by the apparatus placed at 27 cm from the source. Two relationships of the count number as functions of thickness of the plywood samples were built, respectively for wet and dry samples. According to the results obtained with the irradiation technique, it was determined that those plywood samples contain 7% wt of water compare to 6.7% based on the weight of the samples before and after drying. Considering the error in the count measurement which can be associated to water contain error evaluated at 0.4%, this technique works very well.

EXAMPLE 10

Figure 14:
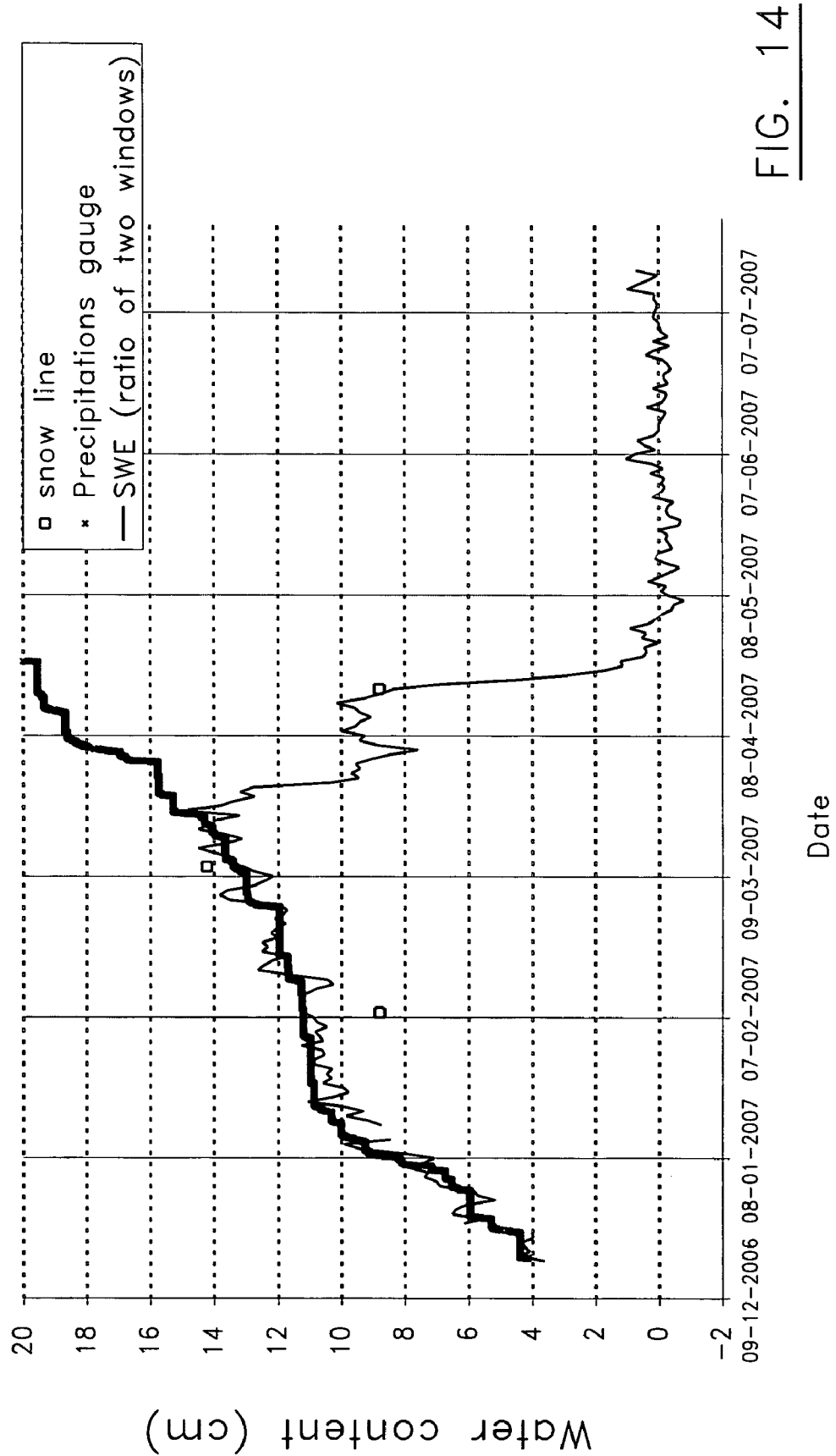
FIG. 14 is a graph illustrating an example of SWE results obtained with the gamma monitoring apparatus at another test site.

FIG. 14 shows results obtained with the gamma monitoring apparatus installed at another experimental site. Precipitations gauge data are compared to SWE data calculated by the gamma monitoring apparatus.

While embodiments of the invention have been illustrated in the accompanying drawings and described above, it will be evident to those skilled in the art that modifications may be made therein without departing from the invention.

The invention claimed is

1. A gamma monitoring apparatus for measuring water equivalent of a snowpack over a selected ground area, comprising:
   a detector unit installable at a given height above the selected ground area, the detector unit having a collimator defining a field of view to be directed on the selected ground area, a scintillator coupled to a photomultiplier tube for detecting gamma rays emitted by naturally radioactive elements present in soil under the snowpack and absorbed by the snowpack in the field of view defined by the collimator, and a temperature sensor, the photomultiplier tube having an output for producing a signal having pulses indicative of the gamma rays;
   a circuit arrangement having:
      a measuring processor unit that measures the pulses in the signal;
      a registering processor unit that registers the pulses exceeding threshold energy levels in a number of energy windows as gamma counts;
      a computing processor unit that periodically computes the water equivalent of the snowpack as functions of the gamma counts in the energy windows and the height of the detector unit with respect to ground level;
      a compensating circuit that numerically corrects effects on the gamma counts resulting from a variation of temperature inside the detector unit measured by the temperature sensor;
      a memory unit that stores data representing the computed water equivalent;
      a transmission circuit that transmits the data; and
   a power supply that provides power to the circuit arrangement and the detector unit; and
   a thermal insulation insulating at least the scintillator of the detector unit.

2. The gamma monitoring apparatus according to claim 1, wherein the scintillator has a NaI(Tl) crystal joined with an optical gel to the photomultiplier tube.

3. The gamma monitoring apparatus according to claim 1, wherein the computing processor unit analyzes gamma rays detected by the detector unit having energy levels lower than 3.8 MeV.

4. The gamma monitoring apparatus according to claim 1, wherein the energy windows comprise a window having a position and a width for registering gamma counts corresponding to Potassium-40.

5. The gamma monitoring apparatus according to claim 4, wherein the energy windows comprise a window having a position and a width for registering gamma counts corresponding to Thallium-208.

6. The gamma monitoring apparatus according to claim 5, wherein the energy windows further comprise:
   a window having a position and a width for registering gamma counts from 0.089 MeV to 2.96 MeV;
   a window having a position and a width for registering gamma counts from 0.450 MeV to 2.96 MeV; and
   a window having a position and a width for registering gamma counts corresponding to Bismuth-214.

7. The gamma monitoring apparatus according to claim 1, wherein the circuit arrangement further comprises a circuit that determines an energy background in the energy windows and removes the energy background from the energy windows.

8. The gamma monitoring apparatus according to claim 1, wherein the circuit arrangement further comprises a circuit that strips energy contamination due to gamma decay coming from radioactive elements falling in higher ones of the energy windows into lower ones of the energy windows.

9. The gamma monitoring apparatus according to claim 1, wherein the circuit arrangement has channels defining respective energy bands covering an energy spectrum including energy bands of the naturally radioactive elements.

10. The gamma monitoring apparatus according to claim 9, wherein the circuit arrangement further comprises a circuit that periodically determines centroids of the gamma counts corresponding to selected ones of the radioactive elements and numerically centering the centroids on predefined corresponding ones of the channels, the gamma counts having been corrected by the compensation circuit according to the variation in temperature inside the detector unit.

11. The gamma monitoring apparatus according to claim 1, further comprising a heating unit for generating and transmitting heat to the detector unit, and wherein the circuit arrangement further comprises a heat controller that controls operation of the heating unit based on a temperature measured by the temperature sensor.

12. The gamma monitoring apparatus according to claim 11, wherein the heating unit comprises a circuit of selectable heat dissipating resistors.

13. The gamma monitoring apparatus according to claim 1, wherein the circuit arrangement further comprises an analog-to-digital converter that converts the signal produced by the detector unit into a digital signal for subsequent processing by the measuring processor unit.

14. The gamma monitoring apparatus according to claim 13, wherein the analog-to-digital converter is adapted to operate at a rate of 30 mega-samples per second.

15. The gamma monitoring apparatus according to claim 1, further comprising:
a tubular enclosure assembly housing the scintillator and the photomultiplier tube of the detector unit and the circuit arrangement, the collimator of the detector unit having an annular shape, the tubular enclosure assembly having an end inside which the scintillator extends and around which the collimator of the detector unit axially projects.

16. The gamma monitoring apparatus according to claim 15, wherein the tubular enclosure assembly comprises an outer tubular element receiving an inner tubular element into which the scintillator, the photomultiplier tube and the circuit arrangement extend, the thermal insulation extending between the inner and outer elements.

17. The gamma monitoring apparatus according to claim 16, wherein the thermal insulation comprises a silica gel material.

18. The gamma monitoring apparatus according to claim 16, wherein the outer element is made of anti-corrosive material, and the inner element is made of heat conductive material.

19. The gamma monitoring apparatus according to claim 16, wherein the circuit arrangement extends adjacent to the photomultiplier tube.

20. The gamma monitoring apparatus according to claim 1, wherein the power supply is battery powered.

21. The gamma monitoring apparatus according to claim 1, wherein the circuit arrangement further comprises a filtering module that filters the signal, and a shaping module that shapes the pulses in the signal.

22. The gamma monitoring apparatus according to claim 1, wherein the circuit arrangement has a circuit that computes a soil moisture content under the snowpack based on the water equivalent computed by the computing processor unit.

23. The gamma monitoring apparatus according to claim 1, wherein the temperature sensor measures a temperature at a level of the circuit arrangement.

24. The gamma monitoring apparatus according to claim 1, wherein the effects on the gamma counts are corrected at a frequency of once per second.

25. A gamma monitoring method for measuring water equivalent of a medium over a selected surface area, comprising the steps of:
installing a detector unit at a given distance from the selected surface area, the detector unit having a collimator defining a field of view directed on the selected surface area, and a scintillator coupled to a photomultiplier tube for detecting gamma rays emitted by radioactive elements in an energy spectrum under 3.8 MeV and absorbed by the medium in the field of view defined by the collimator, the photomultiplier tube having an output for producing a signal having pulses indicative of the gamma rays;
insulating at least the scintillator of the detector unit with a thermal insulation;
measuring the pulses in the signal;
registering the pulses exceeding threshold energy levels in a number of energy windows as gamma counts;
periodically computing the water equivalent of the medium as functions of the gamma counts in the energy windows and the height of the detector unit with respect to a level of the selected surface area;
numerically correcting effects on the gamma counts resulting from a variation of temperature inside the detector unit measured by a temperature sensor;
storing data representing the computed water equivalent; and
controllably transmitting the data for reporting the computed water equivalent.

26. The gamma monitoring method according to claim 25, wherein the medium comprises a snowpack and the selected surface area comprises a corresponding ground area below the snowpack.

27. The gamma monitoring method according to claim 25, wherein the medium comprises a soil humidity and the selected surface area comprises a corresponding ground area.

28. The gamma monitoring method according to claim 25, wherein periodically computing the water equivalent of the medium includes periodically determining centroids of the gamma counts corresponding to selected ones of the radioactive elements and numerically centering the centroids on channels defining respective energy bands covering an energy spectrum including energy bands of the radioactive elements, the gamma counts having been corrected according to the variation in temperature inside the detector unit.

29. The gamma monitoring method according to claim 25, wherein the effects on the gamma counts are corrected at a frequency of once per second.

* * * * *